(12) United States Patent
Dannhauer

(10) Patent No.: US 7,987,726 B2
(45) Date of Patent: Aug. 2, 2011

(54) METHOD AND APPARATUS FOR DIAGNOSIS OF LIQUID LOSSES IN PRESSURE MEASURING TRANSDUCERS FILLED WITH PRESSURE TRANSMITTING LIQUIDS

(75) Inventor: Wolfgang Dannhauer, Sandersdorf (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 111 days.

(21) Appl. No.: 12/310,921

(22) PCT Filed: Jul. 16, 2007

(86) PCT No.: PCT/EP2007/057288
§ 371 (c)(1),
(2), (4) Date: Oct. 2, 2009

(87) PCT Pub. No.: WO2008/031658
PCT Pub. Date: Mar. 20, 2008

(65) Prior Publication Data
US 2010/0058874 A1    Mar. 11, 2010

(30) Foreign Application Priority Data

Sep. 12, 2006 (DE) .......................... 10 2006 043 499

(51) Int. Cl.
*G01L 9/00* (2006.01)

(52) U.S. Cl. ........................................................ 73/717

(58) Field of Classification Search .................. None
See application file for complete search history.

(56) References Cited

U.S. PATENT DOCUMENTS

| 3,326,034 | A | * | 6/1967 | Moore, Jr. et al. ................. 73/40 |
| 3,659,453 | A | * | 5/1972 | Martin, Jr. .......................... 73/40 |
| 3,713,341 | A | * | 1/1973 | Madsen et al. .................... 73/715 |
| 4,543,832 | A | | 10/1985 | Van Over |
| 4,604,891 | A | | 8/1986 | Sgourakes |
| 4,638,656 | A | | 1/1987 | Sgourakes |
| 4,909,063 | A | | 3/1990 | Olsen |
| 5,114,664 | A | | 5/1992 | Terhune |
| 6,311,561 | B1 | * | 11/2001 | Bang et al. ....................... 73/708 |
| 2005/0241363 | A1 | | 11/2005 | Krippner et al. |
| 2007/0095146 | A1 | * | 5/2007 | Brosh .............................. 73/722 |
| 2010/0162820 | A1 | * | 7/2010 | Dannhauer et al. ............. 73/706 |

(Continued)

FOREIGN PATENT DOCUMENTS

CN    1690675    11/2005

(Continued)

*Primary Examiner* — Andre J Allen
(74) *Attorney, Agent, or Firm* — Bacon & Thomas, PLLC

(57) ABSTRACT

A method and apparatus for diagnosis of liquid losses in pressure measuring transducers including a pressure sensor arranged in a pressure measuring chamber, and a pressure transfer structure connected to the pressure measuring chamber A sealed inner space of a separating diaphragm is composed of the inner spaces of the pressure transfer structure and the pressure measuring chamber and is filled with a pressure transmitting liquid, which, serves for transmitting pressure acting on the separating diaphragm to the pressure sensor. An apparatus for detecting liquid losses. The apparatus for detecting liquid losses includes a test element arranged in the sealed inner space. The outer volume of the test element is reducible for diagnosis of liquid losses. An evaluating unit, which serves, during diagnosis, for registering, as a function of a volume reduction of the test element, a pressure measured by the pressure sensor, and, on the basis of this pressure measured as a function of the volume reduction, for detecting whether liquid has escaped.

11 Claims, 3 Drawing Sheets

FOREIGN PATENT DOCUMENTS

| | | |
|---|---|---|
| DE | 37 05 900 A1 | 9/1988 |
| DE | 37 05 901 A1 | 9/1988 |
| DE | 101 01 180 A1 | 9/2002 |
| DE | 101 32 269 A1 | 1/2003 |
| DE | 103 42 368 A1 | 4/2005 |
| DE | 10 2004 019 222 A1 | 11/2005 |
| DE | 10 2005 037 995 A1 | 2/2007 |
| WO | WO 2005/026682 A1 | 3/2005 |

* cited by examiner

METHOD AND APPARATUS FOR DIAGNOSIS OF LIQUID LOSSES IN PRESSURE MEASURING TRANSDUCERS FILLED WITH PRESSURE TRANSMITTING LIQUIDS

TECHNICAL FIELD

The invention relates to method and apparatus for diagnosis of liquid losses in pressure measuring transducers filled with pressure transmitting liquids.

BACKGROUND DISCUSSION

Pressure measuring transducers are used for pressure measurement in almost all branches of industry. Measured pressure values are used e.g. for control (open- or closed-loop control) and/or for monitoring of industrial manufacturing- and/or treatment-processes.

Popular in pressure measuring technology are so-called semiconductor-sensors, e.g. silicon-chips with doped resistor regions, which serve as pressure-sensitive elements. Usually, such pressure sensors utilize a pressure sensor chip in the form of a membrane, or diaphragm, installed in a pressure measuring chamber. Pressure sensor chips are, as a rule, very sensitive and are therefore not directly subjected to the medium, whose pressure is to be recorded. Instead, a pressure transfer means filled with a liquid and having an outer, separating diaphragm is interposed. In operation, the pressure to be measured is applied to the separating diaphragm and transmitted via the pressure transfer means to the pressure sensor chip located in the pressure measuring chamber. This is the situation for measuring absolute pressures, as well as also for measuring relative-pressures and pressure differences.

The inner volume of pressure transfer means and measuring chamber is sealed to liquid in properly operating measuring transducers. There is, however, a danger, that the pressure measuring transducer becomes damaged in such a manner, that liquid escapes from this inner volume. This can come about e.g. as a result of mechanical damage to the separating diaphragm or from unsealed places in the region of the securement of the separating diaphragm, at the filling opening, via which the liquid was filled, or in the region of feedthroughs, e.g. for electrical connection lines of the pressure sensor. Liquid loss leads to change of the measuring characteristics of the measuring transducer. Depending on how large the liquid loss is, such can lead to a reduction in the accuracy of measurement, to considerable functional disturbances or, in the worst case, to a total failure of the measuring transducer. Significant functional disturbances occur especially in the case of low temperatures and/or in the case of high pressures acting on the pressure measuring transducer.

Additionally, the emerging liquid can cause damage, when it leaks, e.g. through a crack in the separating diaphragm, into an industrial manufacturing process, such that it gets mixed into processed products.

In German Patent DE-A 10 2004 019 222, apparatus and method are described for diagnosis of liquid losses from pressure measuring transducers filled with pressure transmitting liquids, wherein a test element is arranged in the pressure measuring chamber of the pressure measuring transducer. For diagnostic purposes, the volume of the test element can be increased by appropriate operation thereof. An increasing of the volume leads to a pressure rise in the pressure measuring chamber, which is then registered by means of the pressure sensor. A diagnosis of leakage is accomplished by registering, as a function of time, pressure rise brought about by a volume increase and comparing the resulting functional relationship with a corresponding reference curve of the intact pressure measuring transducer. If a liquid loss is present, the maximum pressure rise brought about by a defined volume increase is smaller than would be the case, if the pressure measuring transducer were intact. Additionally, liquid of the pressure measuring transducer can be pressed out by the volume increase. This leads then, for example, to a time-delayed falling of the pressure in the pressure measuring chamber, which is reflected in the characteristic curve recorded during the diagnosis.

This method has the disadvantage that the measurement effect achievable by the volume increase of the test element is only relatively small. The reason for this lies in the fact that separating diaphragms are, as a rule, as thin as possible and have a spring stiffness, which is as low as possible, in order to achieve a best possible, uncorrupted transmission of the external pressure acting on the separating diaphragm. Leakages only get detected in this way, after a relatively large amount of liquid has already escaped. This has the result that, as a rule, only major damage to the separating diaphragm can be detected, while smaller leakage locations, e.g. in the region of the separating diaphragm, on other mechanical components or at joints, where only low liquid losses arise, remain undetected.

A further disadvantage lies therein, that the pressure in the pressure measuring chamber is increased during the diagnosis. Through such pressure increase in the presence of a leak, under the right circumstances, even more liquid can be expelled out of the pressure measuring transducer.

SUMMARY OF THE INVENTION

It is an object of the invention to provide a method and apparatus for diagnosis of liquid losses in pressure measuring transducers filled with pressure transmitting liquids.

For this, the invention resides in a pressure measuring transducer, including: a pressure sensor arranged in a pressure measuring chamber; a pressure transfer structure connected to the pressure measuring chamber, which is sealed against external surroundings by a separating diaphragm, on an outer side of which a pressure to be measured acts during a measurement operation, the pressure measuring transducer possesses a sealed inner space, which includes the inner spaces of the pressure transfer structure and the pressure measuring chamber, which is filled with a pressure transmitting liquid, and serves in measurement operation, for transferring a pressure acting on the separating diaphragm to the pressure sensor; and an apparatus for diagnosis of liquid losses, which includes, arranged in the sealed inner space, a test element, whose outer volume located in the inner space is reducible for diagnosis of liquid losses, and has an evaluating unit, which serves during diagnosis for registering a pressure measured by the pressure sensor as a function of volume reduction of the test element, and, on the basis of the pressure measured as a function of volume reduction, detects whether liquid has escaped.

In a further development, the maximum achievable volume reduction of the test element as a function of liquid volume enclosed between the separating diaphragm and its diaphragm bed in the unloaded state is so selected, that the separating diaphragm lies against the diaphragm bed, when the test element assumes minimum volume.

In a first embodiment, the test element includes a piezoelectric element, whose volume is reducible by applying an electrical voltage.

In a second embodiment, the test element is a micromechanical bellows.

In a third embodiment, the test element includes a movable piston.

Additionally, the invention includes a method for diagnosis of liquid losses in pressure measuring transducers of the invention, wherein: the volume of the test element is reduced, until either a non-linear falling of the measured pressure occurs, or until an upper limit for volume reduction is reached; upon occurrence of a non-linear decrease, the associated volume reduction is compared with a reference value recorded in the case of intact pressure measuring transducer; and an, on occasion, occurring liquid loss is quantified on the basis of a difference between the associated volume reduction and the reference value.

In a further development of this method, the diagnoses are reoccurringly executed, liquid losses occurring, on occasion, are ascertained as a function of time, and, on the basis of liquid losses as a function of time, predictions are made concerning reliability of the measuring transducer, its life expectancy and/or a maintenance schedule or need for replacement is derived.

Additionally, the invention includes a method for diagnosis of liquid losses of the pressure measuring transducer of the invention, wherein: the volume of the test element is reduced to a test volume; associated pressure measured with the pressure sensor is registered; compared with a predetermined reference pressure; and based on such comparison, it is detected, whether liquid loss is present.

In a first further development of the latter method, the measured pressure is compared with a reference value, and the evaluating unit diagnoses a liquid loss, when measured pressure is smaller than the reference value.

In a further development in this connection, a diagnosed liquid loss is quantified based on a difference between measured pressure and reference value.

In a second further development of the last-mentioned method, measured pressure is compared with a reference value, and the evaluating unit diagnoses damage leading to pressure equalization with the environment, when the measured pressure is larger than the reference value.

BRIEF DESCRIPTION OF THE DRAWINGS

The invention and further advantages will now be explained in greater detail on the basis of the drawing, in which three examples of embodiments are illustrated; equal elements are provided in the figures with equal reference characters. The figures of the drawing show as follows.

DETAILED DISCUSSION

Figure 1:
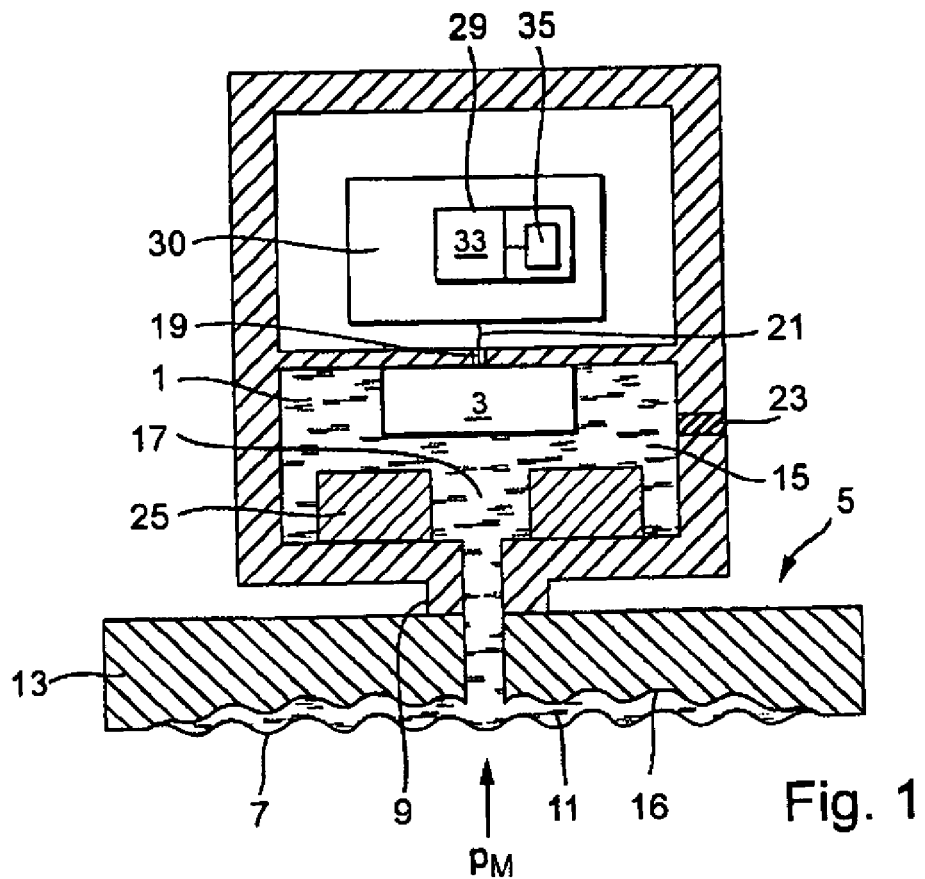
FIG. 1 a section through a pressure transducer of the invention.

FIG. 1 shows a section through a pressure measuring transducer of the invention having a pressure sensor 3, e.g. a semiconductor-sensor, arranged in a pressure measuring chamber 1. Suited for such application are e.g. silicon-chips with doped resistance elements. In the case of the shown pressure measuring transducer, it is an absolute measurement transducer. Correspondingly, the pressure sensor here is an absolute pressure sensor. The invention is, however, not limited to absolute pressure measuring transducers, but, instead, is applicable in analogous form also to relative-pressure measuring transducers and to pressure-difference measuring transducers.

Connected to the pressure measuring chamber 1 is a pressure transfer means 5, which is sealed against external surroundings by a separating diaphragm 7. In measurement operation, a pressure $p_M$ to be measured acts externally on the separating diaphragm 7. Pressure transfer means 5 includes, in the shown example of an embodiment, a short capillary line 9, which opens into a pressure receiving chamber 11 of a diaphragm carrier 13 sealed against external surroundings by the separating diaphragm 7.

The pressure measuring transducer has a sealed inner space 15, which comprises the inner spaces of the pressure measuring chamber 1 and the pressure transfer means 5. The inner space of the pressure transfer means 5 is composed of the inner space of the capillary line 9 and the inner space of the pressure receiving chamber 11. The sealed inner space 15 is filled with a pressure transmitting liquid 17. Liquid 17 is preferably an incompressible liquid having a low coefficient of thermal expansion, e.g. a silicone oil. It serves, in measurement operation, to transfer to the pressure sensor 3 a pressure $p_M$ acting externally on the separating diaphragm 7.

Diaphragm carrier 11 includes a diaphragm bed 16, which preferably has the shape of the separating diaphragm 7. Diaphragm bed 16 and separating diaphragm 7 enclose the pressure receiving chamber 11. Diaphragm bed 16 serves to protect the separating diaphragm 7 from overloads. If a pressure $p_M$ acting on the separating diaphragm 5 exceeds a predetermined upper limit, then the separating diaphragm 7 rests on the diaphragm bed 16 and is thereby protected from permanent deformations or damage.

It can, however, not be completely excluded, that the separating diaphragm 7 or other components of the pressure measuring transducer might eventually become damaged, e.g. because of aging processes or by external, mechanical actions. Upon such events, sealed inner space 15 can become unsealed, so that leakages occur, with liquid 17 escaping from the inner space 15. Especially susceptible to such damage is the separating diaphragm 7. Leakages can, however, also occur e.g. in the region of connection locations of the capillary line 9, in areas of feed-throughs 19 for connection lines 21 of the pressure sensor 3, or in the region of a filling opening 23 provided for filling the sealed inner space 15 with liquid 17. Liquid loss leads to change in the measuring characteristics of the pressure measuring transducer, which, depending on the amount of the escaped liquid, can lead to deterioration of the accuracy of measurement, to significant measurement disturbances, or even to total failure of the measuring transducer. In order to prevent disadvantages associated therewith, as well as, on occasion, dangers resulting therefrom for human beings and environment, it is important that liquid losses be recognized as early as possible, in order to be able to react quickly with safety in mind. The situation can be cared for, for example, by maintenance or by replacement of the measuring transducer.

For this, the pressure measuring transducer of the invention includes an apparatus for diagnosis of liquid losses. A core aspect of this apparatus is, arranged in the sealed inner space, a test element 25, whose outer volume located in the inner space 15 is reducible, for diagnosis of liquid losses.

Such a test element 25 can be implemented in various ways. In the example of an embodiment shown in FIG. 1, the test element 25 includes a, here, annular, piezoelectric element, whose volume can be reduced by application of an electrical voltage.

Figure 2:
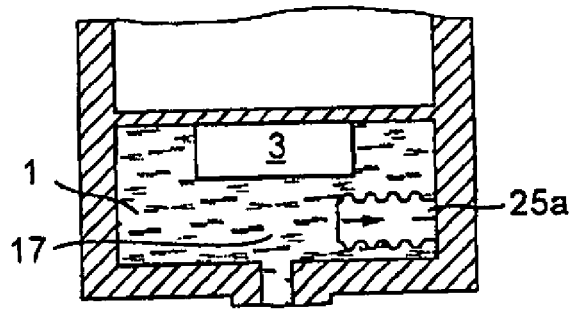
FIG. 2 a section of a pressure measuring transducer having a resilient bellows as test element.
Figure 3:
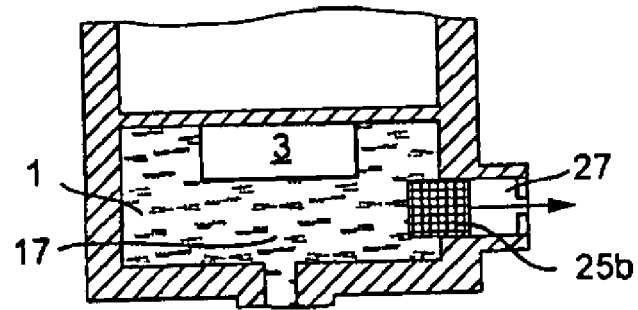
FIG. 3 a section of a pressure measuring transducer, wherein the test element comprises a piston.

In FIGS. 2 and 3, respectively, a section of the pressure measuring transducer containing the pressure measuring chamber 1 is illustrated, in which two further examples of embodiments for test elements are arranged. In the case of the test element shown in FIG. 2, such is a micromechanical bellows 25a, whose outer volume is reduceable likewise by an appropriate electrical activation. This is illustrated symbolically by an arrow in the interior of the bellows 25a.

In the case of the example of an embodiment shown in FIG. 3, the test element includes, protruding into the measuring chamber 1, a piston 25b, which can be moved, for example, by means of a stepper motor (not shown in FIG. 3) completely or partially out of the pressure measuring chamber 1. This is likewise indicated by an arrow. In such case, piston 25b travels in a cylinder 27 bordering on the pressure measuring chamber 1 and sealed relative thereto. This movement leads to reduction of the outer volume of the piston 25b located in the pressure measuring chamber 1.

The maximum achievable volume reduction $\Delta V_{max}$ of the respective test element 25, 25a, or 25b is preferably so selected, as a function of the liquid volume enclosed between the separating diaphragm 7 and its diaphragm bed 16 in the pressure receiving chamber 11 in the unloaded state, that the separating diaphragm 7 lies against its diaphragm bed 16, when the test element 25 assumes its minimum volume.

Figure 4:
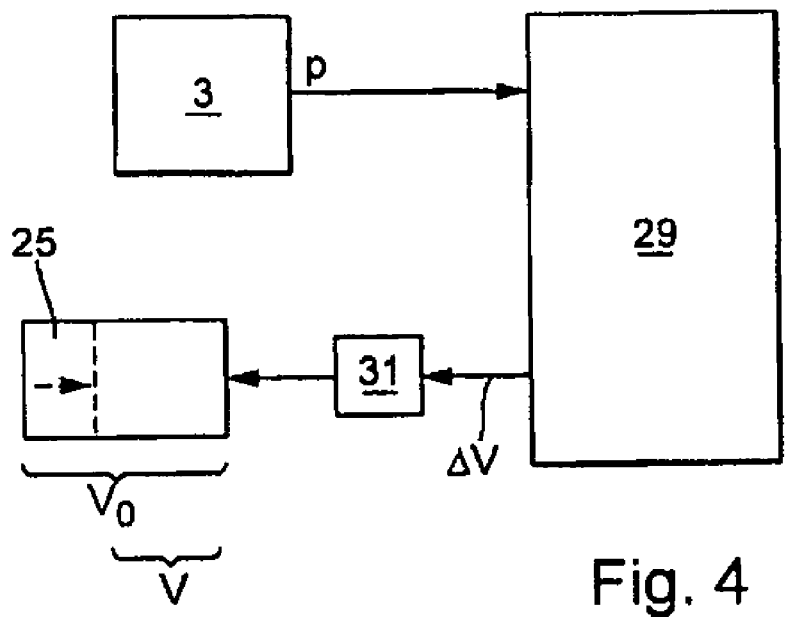
FIG. 4 a block diagram of a pressure transducer.

Besides the test element 25, the apparatus includes an evaluating unit 29, which serves, during the diagnosis, for registering, as a function of volume reduction $\Delta V$ of the test element 25, a pressure p measured by the pressure sensor 3. The evaluating unit 29 is, for example, integrated in a measuring electronics 30 of the pressure measuring transducer and connected via appropriate connection lines to the pressure sensor 3 and to the test element 25. FIG. 4 shows a simplified block diagram in this respect. There, evaluating unit 29 is connected, via a control unit 31, to the test element 25. During the diagnosis, evaluating unit 29 sends control signals to the control unit 31, which then, in turn, effects an electrical activation of the test element 25, which effects a volume reduction $\Delta V$ of the test element 25 corresponding to the control signal. The activating of the test element 25 can naturally also occur in other manner, e.g. from the measuring electronics 30. In the first case, information concerning the current outer volume of the test element 25 is supplied to the evaluating unit 29, for example, via a corresponding output signal of the control unit.

The actual diagnosis occurs then in the evaluating unit 29. This detects on the basis of the pressure p, measured as a function of the volume reduction $\Delta V$, whether liquid has escaped. Such is done preferably by a comparison of reference measurements with measurements of the pressure sensor 3 made during the diagnosis as a function of effected current volume reduction $\Delta V$ of the test element 25. Instead of the volume reduction $\Delta V$, naturally, also as well, the associated outer volume of the test element 25 located in the inner space 15 can be applied. Both variables are convertible via the starting volume $V_0$ of the test element 25 one into the other and are, thus, of equal value.

Figure 5:
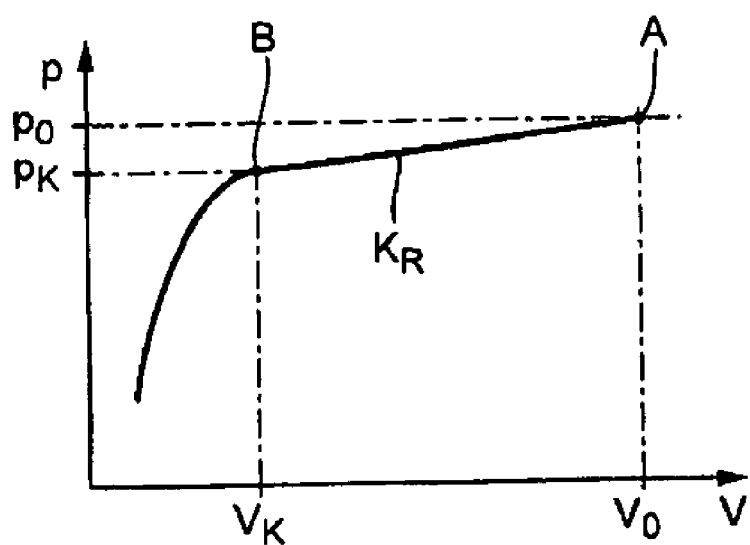
FIG. 5 a reference characteristic curve of the pressure measuring transducer of FIG. 1.

FIG. 5 shows a reference characteristic curve $K_R$ of an intact pressure measuring transducer completely filled with liquid. Shown is pressure p recorded with the pressure sensor 3 as a function of the volume V of the test element 25. Starting point A of the characteristic curve is, in such case, the starting volume $V_0$ of the test element 25. The internal pressure in such case is $p_0$. Proceeding from starting point A, continuous reduction of the volume of the test element 25 leads, first, to a slow and steady fall of the measured pressure p in the pressure measuring chamber 1. Pressure p decreases essentially linearly with the outer volume V of the test element 25. Through the negative pressure produced by the volume reduction, the separating diaphragm 7 moves toward its diaphragm bed 16, until it lies against the diaphragm bed. In such case, liquid flows from the pressure receiving chamber 11 into the pressure measuring chamber 1. At the moment, when the separating diaphragm 7 comes close to its diaphragm bed 16, the spring stiffness of the separating diaphragm 7 increases abruptly. This leads, upon further decrease of the outer volume of the test element 25, to a drastic, non-linear fall off of the measured pressure p as a function of the additional reduction of the outer volume V of the test element 25 located in the inner space 15. Due to the drastic change of the spring stiffness of the separating diaphragm 7, this leads to a significantly greater measurement effect, than the measurement effect, which is achievable by the increasing of the outer volume described in the state of the art. There, the separating diaphragm moves outwardly, away from the diaphragm bed. In such case, no drastic changes of the transfer behavior occur.

The boundary between these two regions is given in FIG. 5 by the measurement point B, at which the pressure $p_K$ reigns at an outer volume $V_K$ of the test element 25. The volume reduction present at the measurement point B, $\Delta V_R = V_0 - V_K$, from the starting volume $V_0$ to the volume $V_K$, is dependent on the volume enclosed under the separating diaphragm 7 in the unloaded state and can, in the context of the diagnosis explained below in greater detail, be used for quantifying an, on occasion, present, liquid loss.

With the pressure measuring transducer of the invention, various methods for diagnosis of liquid losses are performable.

In a first method, the volume V of the test element 25 is reduced, starting from the starting volume $V_0$, until either the above described, non-linear fall off of the measured pressure p as a function of the volume V of the test element 25 arises, or until an upper limit for the volume reduction, e.g. the maximum possible volume reduction $\Delta V_{max}$, is reached. The occurrence of a non-linear decrease is monitored by the evaluating unit 29. This is done, for example, by a corresponding evaluating algorithm, which calculates slope of a recorded diagnostic characteristic curve $K_x$ as a function of the associated volume reduction $\Delta V_x$ and compares such with the slope at a preceding measurement point or with a predetermined reference slope. If there is a non-linear fall off, then the associated volume reduction $\Delta V_x$ recorded at the associated measurement point $B_x$ is compared with a reference value R recorded in the case of intact pressure measuring transducer, and an, on occasion, occurring liquid loss $L_x$ is quantified on the basis of a difference between the associated volume reduction $\Delta V_x$ and the reference value R. The occurring liquid loss $L_x$ corresponds to the difference between the associated volume reduction $\Delta V_x$ and the reference value R.

The volume reduction $\Delta V$ can occur step-wise or continuously. The corresponding measurement points or measurement curves are evaluated in the evaluating unit 29. For this, the evaluating unit 29 has, preferably, a microprocessor 33, in which evaluating algorithms stored in a memory 35 are executed. If only spaced measurement points are taken in the particular diagnostic characteristic curve K, then the accuracy of ascertaining the relevant volume reduction ΔV or the particular measurement point B can be further improved by interpolation.

Figure 6:
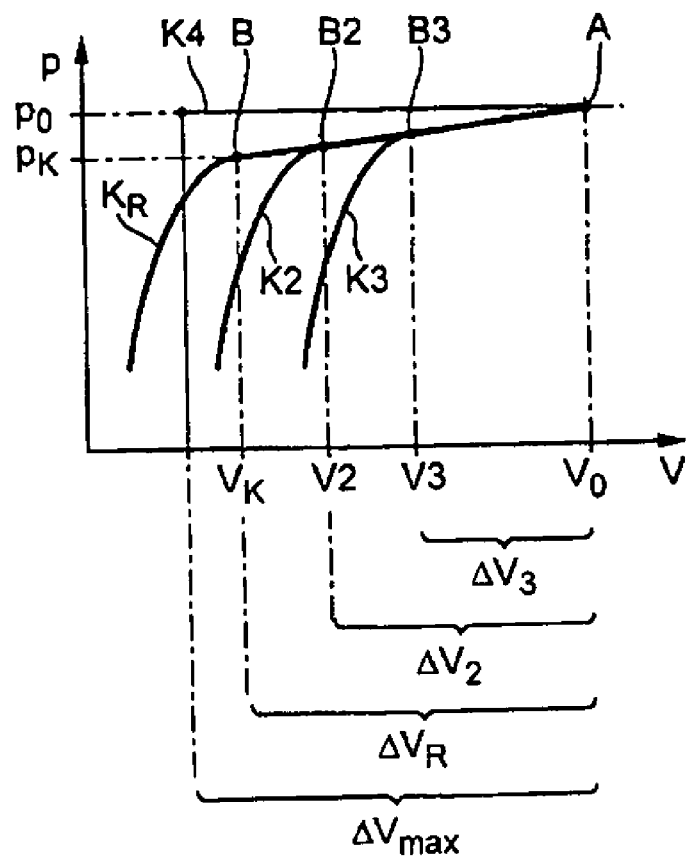
FIG. 6 a number of diagnostic characteristic curves of the pressure transducer of FIG. 1 recorded in the case of different liquid losses.

FIG. 6 shows corresponding diagnostic characteristic curves. By way of example, a pressure measuring transducer was selected, in the case of which, in the unloaded state completely filled with liquid, a liquid volume of 300 mm³ was located in the pressure receiving chamber 11 under the separating diaphragm 7.

The diagnostic characteristic curve $K_R$ is for the reference characteristic curve $K_R$ of the intact, completely filled, pressure measuring transducer, as such curve is shown in FIG. 5. The diagnostic characteristic curve $K_R$ displays, between the measurement points A and B, the already described, linear behavior. At measurement point B, the separating diaphragm 7 is so near to its diaphragm bed 16, that its stiffness drastically rises. Further reduction of the outer volume below the associated volume $V_K$ leads to the drastic pressure decrease. The associated volume reduction $\Delta V_R = V_0 - V_K$ amounts, in the given numerical example, to 260 mm³ and forms the reference value R for the quantifying of the, on occasion, occurring liquid losses L. The coordinates of the measurement point B can be ascertained e.g. by an evaluating of the slope of the diagnostic characteristic curve $K_R$ by the evaluating unit 29.

The second diagnostic characteristic curve K2 was registered with the same pressure measuring transducer, in the case of which a liquid loss of a liquid amount L2 had taken place. Also here, the diagnostic characteristic curve K2 begins at the starting point A, where the test element 25 has the starting volume $V_0$ and pressure $p_0$ reigns in the pressure measuring chamber 1. Due to the liquid loss L2, separating diaphragm 7, in the case of reduction of the volume of the test element 25, however, nears its diaphragm bed 16 already much earlier. The corresponding measurement point B2 to be ascertained by the evaluating unit 29, where the diagnostic characteristic curve K2 no longer behaves linearly, is, therefore, already reached at a volume V2. The associated volume reduction $\Delta V_2 = V_0 - V2$ amounts, in this numerical example, to 210 mm³. The difference between this volume reduction $\Delta V_2$ and the reference value R amounts here to 50 mm³ and is a measure for the liquid loss L2. One, naturally, obtains the same result, when one uses the volume $V_K$ at the measurement point B of the reference characteristic curve as reference value R' and ascertains the difference between this reference value R' and the volume V2 of the test element 25 at the measurement point B2.

The third diagnostic characteristic curve K3 was registered with the same pressure measuring transducer, in the case of which a liquid loss L3 had taken place, a loss larger than the liquid loss L2. Also here, the diagnostic characteristic curve K3 begins at the starting point A, at which the test element 25 has the starting volume $V_0$ and the pressure $p_0$ reigns in the pressure measuring chamber. Due to the enlarged liquid loss, separating diaphragm 7, by the reduction of the volume of the test element 25, now reaches its diaphragm bed 16 yet earlier. The corresponding measurement point B3 to be ascertained by the evaluating unit 29, where the diagnostic characteristic curve K3 no longer behaves linearly, is, therefore, already achieved at a volume V3. The associated volume reduction $\Delta V_3 = V_0 - V3$ amounts, in the numerical example, to 160 mm³. The difference between this volume reduction $\Delta V_3$ and the reference value R amounts here to 100 mm³ and is a measure for the lost liquid amount L3. One obtains the same result, naturally, when one uses the volume $V_K$ at the measurement point B of the reference characteristic curve as reference value R' and ascertains the difference between this reference value R' and the volume V3 of the test element 25 at the measurement point B3.

The fourth diagnostic characteristic curve K4 was registered with the same pressure measuring transducer, wherein the pressure measuring transducer was so strongly damaged, that pressure equalization with the environment occurred. Such is the case, for example, when the separating diaphragm 7 has a crack or hole in it. Then, volume reduction of the test element 25 brings about no pressure decline in the pressure measuring chamber 15. The pressure p recorded with the pressure sensor 3 remains constant. The diagnostic characteristic curve K4 has no longer a region, in which the measured pressure p as a function of the volume V of the test element 25 behaves non-linearly. In this case, the diagnostic method is continued, until a predetermined upper limit, here $\Delta V_{max}$, is reached for the volume reduction and, thereafter, the diagnostic method is terminated. As upper limit, alternatively, also the volume reduction $\Delta VR$ present at the measurement point B of the reference characteristic curve can be used.

Preferably, this diagnostic method is executed reoccurringly, and liquid losses L occurring, on occasion, are ascertained as a function of time. On the basis of the behavior as a function of time, predictions are then made concerning the reliability of the pressure measuring transducer, its anticipated life expectancy and/or a maintenance schedule or need for replacement derived. This can occur in quite varied manner, matched to the particular conditions and requirements at the location of use. In the case of applications, where any liquid escape is to be prevented, a still small, diagnosed liquid loss is used to trigger an alarm and/or an immediate replacement of the pressure measuring transducer. In other applications, for example, an upper limit for the liquid loss L can be predetermined. If this upper limit is reached, then the pressure measuring transducer issues a maintenance request or need for replacement or triggers an alarm. Additionally, before reaching this upper limit, based on the development of the occurring liquid losses L as a function of time, remaining life expectancy, e.g. probable time remaining before reaching the upper limit, can be estimated, and output by the pressure measuring transducer.

Figure 7:
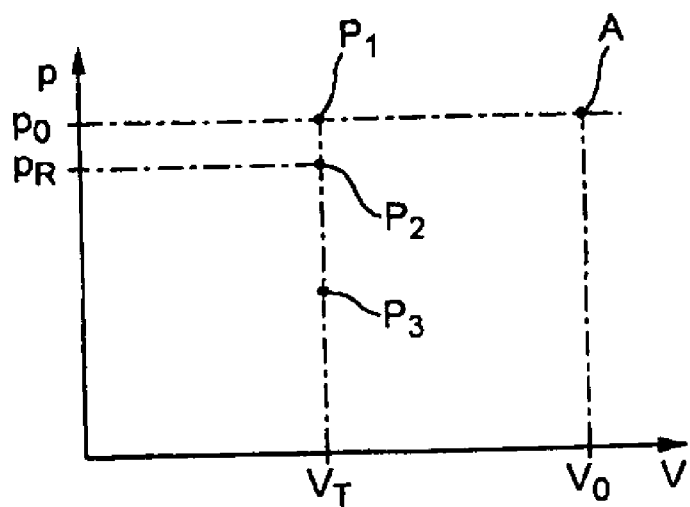
FIG. 7 a number of measurement points of the pressure transducer of FIG. 1 recorded in the case of different liquid losses for a predetermined test volume of the test element.

Alternatively to the above described methods, in which the outer volume is step-wise or continuously reduced, and corresponding diagnostic characteristic curves are registered, also diagnostic methods can be performed with the pressure measuring transducer of the invention, wherein, in each case, only a single measurement point P is recorded. FIG. 7 shows an example of an embodiment in this connection. In such case, the volume V of the test element 25 located in the inner space 15 is reduced to a predetermined test volume $V_T$ and the associated measured pressure $p_T$ is registered with the pressure sensor 3. Then, the measured pressure $p_T$ is compared with a predetermined reference pressure $p_R$, and, on the basis of this comparison, it is determined, whether a liquid loss L is present. Used as reference pressure $p_R$ is preferably the pressure $p(V_T)$ of the reference characteristic curve $K_R$ reached at the test volume $V_T$. If the pressure $p_T$ measured upon reaching the test volume $V_T$ lies above the reference pressure $p_R$, then a pressure equalization with the environment has taken place. This is the case at the measurement point $P_1$ in the example of an embodiment shown in FIG. 7. If the measured pressure p is about equal to the reference pressure $p_R$, then it can be assumed therefrom, that the pressure measuring transducer is working properly. This is the case in FIG. 7 at the measurement point $P_2$. If the measured pressure p lies below the reference pressure $p_R$, then a liquid loss L has taken place. This is the case in FIG. 7 at the measurement point $P_3$.

Corresponding to the above explanations, evaluating unit 29 diagnoses a liquid loss L, when the measured pressure $p(V_T)$ is smaller than the reference value $p_R$. Additionally, a liquid loss L diagnosed in this way can be quantified on the basis of the difference between the measured pressure $p(V_T)$ and the reference value $p_R$. For this, for example, reference measurements can be utilized, in the case of which, for predetermined liquid losses, the respective differences between the measured pressure $p(V_T)$ and the reference value $p_R$ are determined. Alternatively, liquid loss L can be quantified or estimated by a comparison of present difference with corresponding differences derived from the characteristic curves described on the basis of FIG. 6.

If the measured pressure $p(V_T)$ is greater than the reference pressure $p_T$, then the evaluating unit 29 diagnoses damage of the pressure measuring transducer leading to pressure equalization with the environment.

Selection of the test volume $V_T$ is preferably made as a function of the size of the liquid losses L to be diagnosed.

In the case of applications where only the occurrence of a large liquid loss L should be detected, e.g. a liquid loss, which results in a significant compromise of the accuracy of measurement, a relatively large test volume $V_T$ or an accordingly low volume reduction $\Delta V_T = V_0 - V_T$ can be selected for the test element 25. The choice of test volume $V_T$ can be made, for example, on the basis of the diagnostic characteristic curves K shown in FIG. 6. If, for example, a liquid loss L should be detected, which is larger than or equal to 100 mm³, then a test volume $V_T$ must be chosen, that falls in the non-linear region of the diagnostic characteristic curve K3; $V_T$ must thus be smaller than V3. If, for example, a liquid loss L should be detected, which is larger than or equal to 50 mm³, then a test volume $V_T$ must be chosen, that falls in the non-linear region of the diagnostic characteristic curve K2; $V_T$ must thus be smaller than V2.

Should even minimal liquid losses L be detected, then a test volume $V_T$ must be chosen, that is smaller than or equal to the volume $V_K$ of the test element 25 at the measurement point B of the reference characteristic curve $K_R$.

If the liquid loss L exceeds the liquid loss registerable with the particular test volume $V_T$, then the associated measurement point P is located in the non-linear region of the associated diagnostic characteristic curve K. There occurs therewith, a very marked deviation from the particular reference pressure $p_R$, which is larger, the more the liquid loss L exceeds the registerable liquid loss. If one takes the smallest registerable liquid loss as reference variable, then the size of the deviation between the pertinent reference pressure $p_R$ and the pressure measured upon reaching the test volume $V_T$ is a measure for the size of the liquid loss L. If the liquid loss L exceeds the liquid loss registerable with the particular test volume $V_T$, then, also here, a quantifying of the liquid loss L is possible by a corresponding comparison with one or more reference characteristic curves or values.

Also here, the diagnoses are preferably performed reoccurringly, and liquid losses occurring, on occasion, are recorded as a function of time, on the basis of which predictions are made concerning reliability of the measuring transducer, its anticipated life expectancy and/or a maintenance schedule or need for replacement derived.

Of course, the last explained method is also extendable to a number of different test volumes $V_T$.

The invention claimed is:

1. A pressure measuring transducer comprising:
    a pressure measuring chamber; a pressure sensor arranged in said pressure measuring chamber;
    pressure transfer means connected to said pressure measuring chamber, which is sealed against external surroundings by a separating diaphragm, and on which a pressure to be measured acts externally in a measurement operation;
    a sealed inner space, which includes the inner spaces of said pressure transfer means and said pressure measuring chamber, which is filled with a pressure transmitting liquid, and which serves in measurement operations, for transferring a pressure acting on said separating diaphragm to said pressure sensor; and
    an apparatus for diagnosis of liquid losses, which includes, arranged in said sealed inner space, a test element, whose outer volume located in said sealed inner space is reducible for diagnosis of liquid losses, and an evaluating unit, which serves during diagnosis for registering a pressure measured by said pressure sensor as a function of volume reduction of said test element, and, on the basis of pressure measured as a function of volume reduction, detects whether liquid has escaped.

2. The pressure measuring transducer as claimed in claim 1, wherein:
    maximum achievable volume reduction of said test element is so selected as a function of a liquid volume contained between said separating diaphragm and its diaphragm bed in the unloaded state, that said separating diaphragm lies against its diaphragm bed, when said test element assumes a minimum volume.

3. The pressure measuring transducer as claimed in claim 1, wherein:
    said test element contains a piezoelectric element, whose volume is reducible by applying an electrical voltage.

4. The pressure measuring transducer as claimed in claim 1, wherein:
    said test element is a micromechanical bellows.

5. The pressure measuring transducer as claimed in claim 1, wherein:
    said test element includes a movable piston.

6. A method for diagnosis of liquid losses of a pressure measuring transducer including: a pressure measuring chamber; a pressure sensor means;
    an apparatus for diagnosis of liquid losses including a test element; and an evaluation unit, the method, comprising the steps of:
    reducing the volume of the test element, until either a non-linear falling off of the measured pressure occurs, or until an upper limit for volume reduction is reached;
    upon occurrence of a non-linear decrease, a volume reduction associated therewith is compared with a reference value recorded in the case of intact pressure measuring transducer, and
    on occasion, occurring liquid loss is quantified on the basis of a difference between the associated volume reduction and the reference value.

7. The method as claimed in claim 6, wherein:
    the diagnoses are reoccurringly executed;
    liquid losses occurring, on occasion, are ascertained as a function of time; and
    on the basis of liquid losses as a function of time, predictions are made concerning reliability of the measuring transducer, its life expectancy and/or a maintenance schedule or need for replacement is derived.

8. The method for diagnosis of liquid losses of a pressure measuring transducer as claimed in claim 6, wherein:
   the volume of the test element is reduced to a test volume, the associated pressure measured with the pressure sensor is registered, and compared with a predetermined reference pressure; and
   based on such comparison, it is detected, whether a liquid loss is present.

9. The method for diagnosis of liquid losses of a pressure measuring transducer as claimed in claim 8, wherein:
   the measured pressure is compared with a reference value; and
   the evaluating unit diagnoses a liquid loss, when the measured pressure is smaller than the reference value.

10. The method for diagnosis of liquid losses of a pressure measuring transducer as claimed in claim 9, wherein:
   a diagnosed liquid loss is quantified on the basis of difference between the measured pressure and the reference value.

11. The method for diagnosis of liquid losses of a pressure measuring transducer as claimed in claim 8, wherein:
   the measured pressure is compared with a reference value; and
   the evaluating unit diagnoses damage leading to pressure equalization with the surroundings, when the measured pressure is larger than the reference value.

* * * * *